July 9, 1957
J. B. KUCERA
2,798,627
LOADER ATTACHMENT
Filed Feb. 3, 1956
3 Sheets-Sheet 1
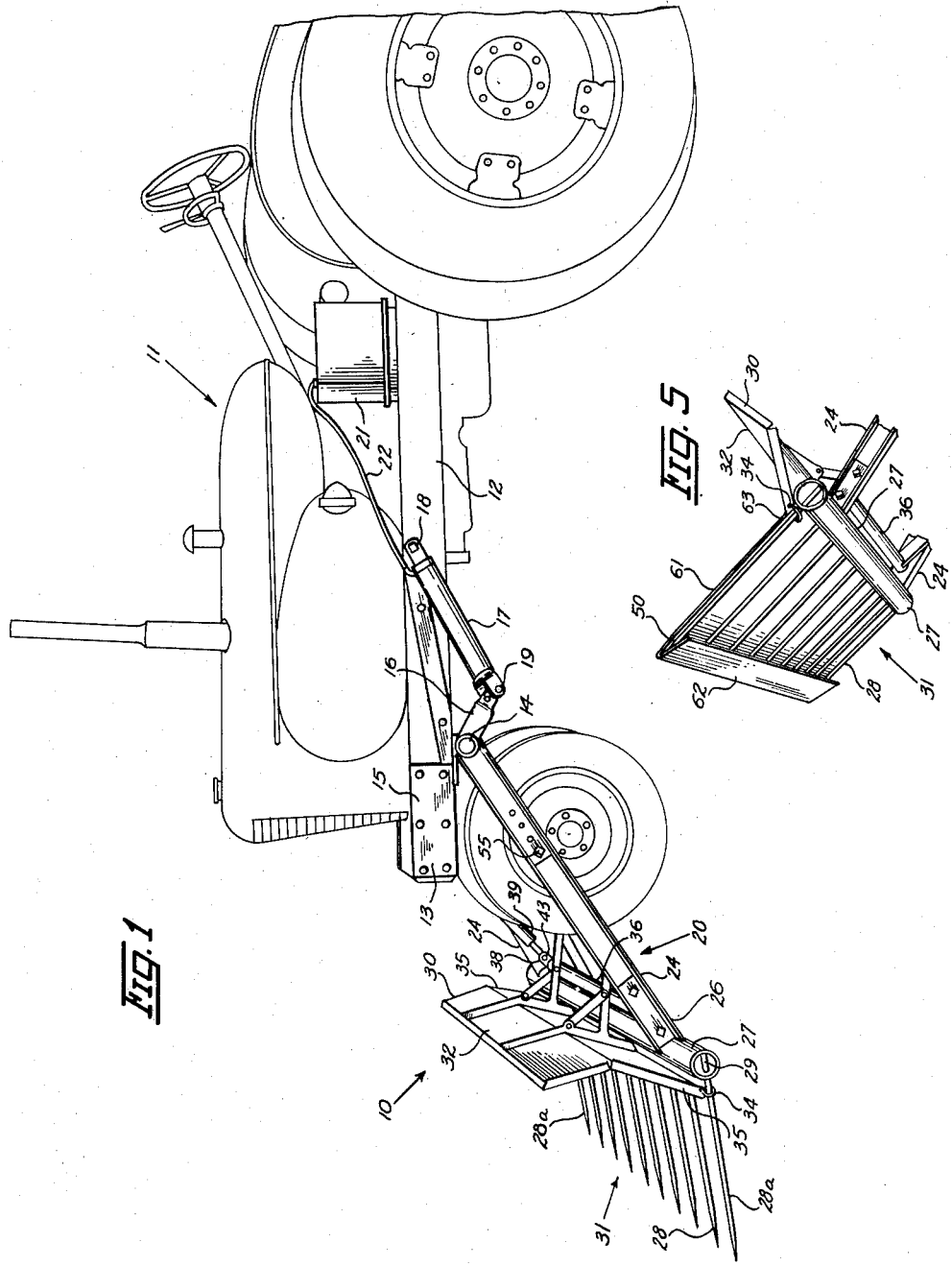
INVENTOR.
JOSEPH B. KUCERA
BY Rudolph L. Lowell
ATTORNEY.

July 9, 1957  J. B. KUCERA  2,798,627
LOADER ATTACHMENT
Filed Feb. 3, 1956  3 Sheets-Sheet 3
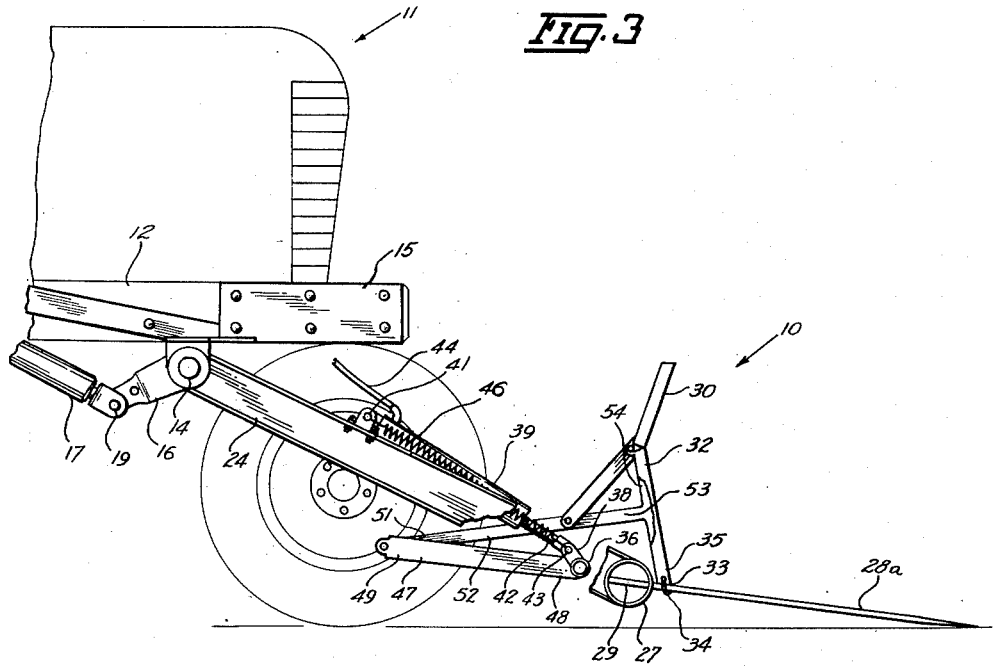
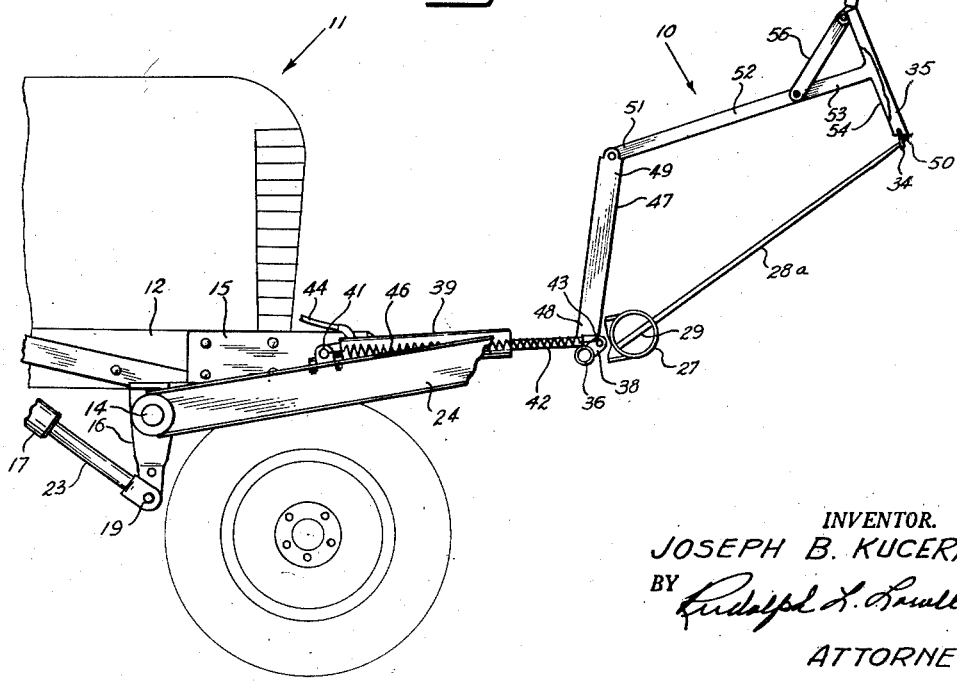
INVENTOR.
JOSEPH B. KUCERA
BY
ATTORNEY.

July 9, 1957
J. B. KUCERA
2,798,627
LOADER ATTACHMENT
Filed Feb. 3, 1956
3 Sheets-Sheet 2
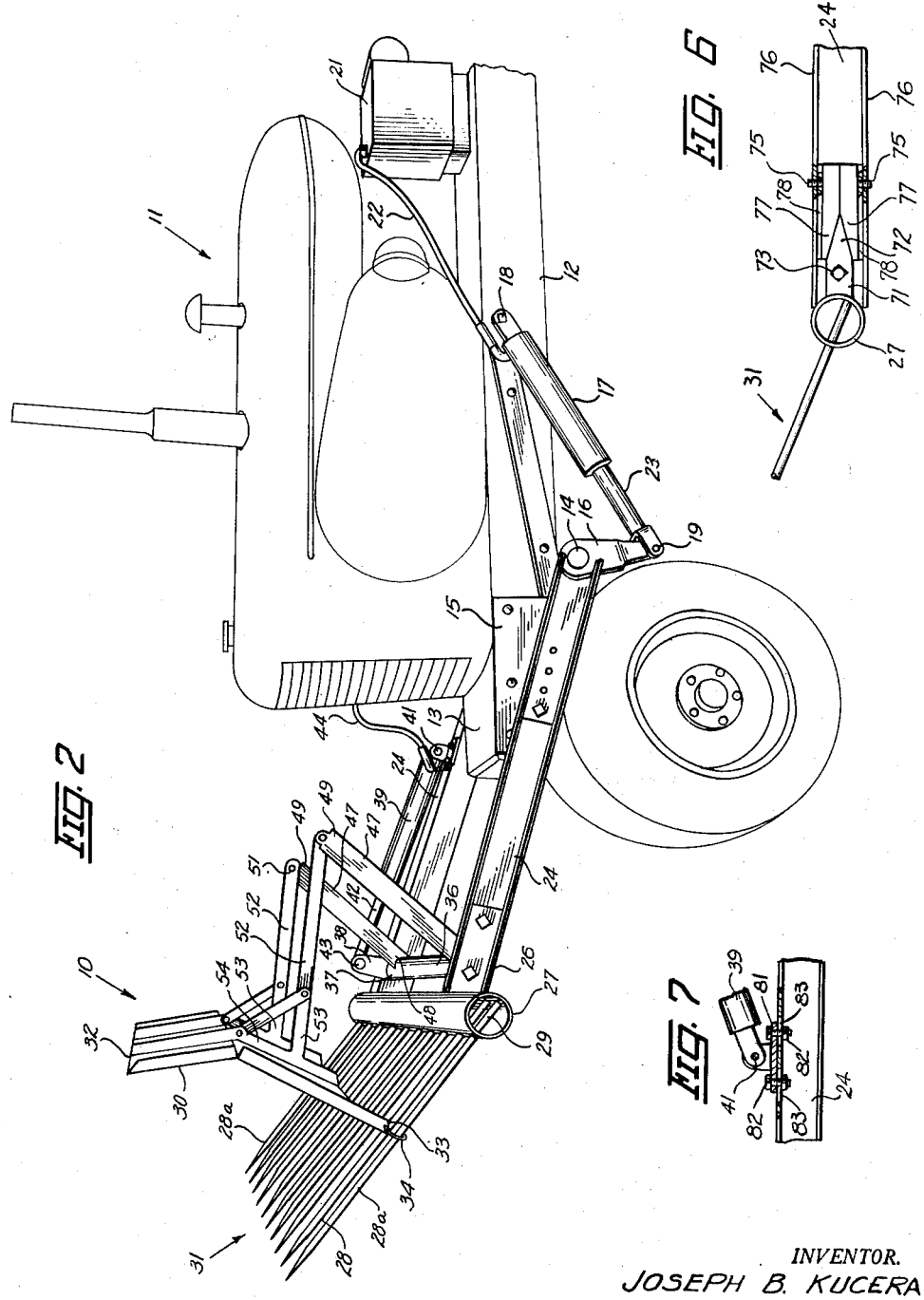
INVENTOR.
JOSEPH B. KUCERA
BY
Rudolph L. Lowell
ATTORNEY.

United States Patent Office 2,798,627
Patented July 9, 1957

2,798,627
LOADER ATTACHMENT
Joseph B. Kucera, Traer, Iowa
Application February 3, 1956, Serial No. 563,237
2 Claims. (Cl. 214—510)

This invention relates generally to loaders and more particularly to a loader attachment for a farm tractor.

An object of this invention is to provide an improved loader attachment for a farm tractor.

A further object of this invention is to provide a loader attachment which is readily attachable to and detachable from a farm tractor.

Another object of this invention is to provide a tractor mounted loader attachment which includes a load carrying unit, rigidly supported on a pair of lift booms and provided with a back ejector plate for dumping material from the load carrying unit to thereby dispense with the necessity for raising the load carrying unit above the tractor.

A further object of this invention is to provide a loader attachment which includes a loading fork and a covering plate which is mountable on the fork to convert the fork to a scoop.

Another object of this invention is to provide a loader attachment which includes a load carrying unit and a back ejector plate mounted on the unit for concurrent sliding and rotational movement relative thereto to insure a complete dumping of material therefrom when desired.

Still another object of this invention is to provide a loader attachment for a farm tractor which is rugged and simple in construction, economical to manufacture and efficient in performing all loader operations without impairment of the maneuverability of the tractor or visibility of the tractor operator.

Further objects, features and advantages of this invention will become apparent from a consideration of the following description when taken in connection with the accompanying drawing in which:

Fig. 1 is a perspective view of the loader attachment of this invention shown in assembly relation with a farm tractor, only a portion of which is shown, and illustrating the attachment in a lower or loading position;

Fig. 2 is a fragmentary perspective view of the tractor and loader attachment assembly illustrated in Fig. 1, and showing the attachment in an upper or dumping position;

Fig. 3 is a side elevational view of the loader attachment of this invention, shown in assembly relation with a farm tractor, only a front portion of which is shown, and illustrating the attachment in a lower or loading position;

Fig. 4 is a side elevational view, illustrated similarly to Fig. 3, and showing the attachment in a dumping position;

Fig. 5 is a perspective view of the load carrying fork for the loader attachment of this invention, and illustrating a covering plate applied to the fork to adapt the fork for use as a scoop;

Fig. 6 is a fragmentary side elevational view illustrating a modified mounting for the load carrying unit in the loader attachment of this invention; and Fig. 7 is an enlarged fragmentary elevational view showing the mounting for a hydraulic cylinder assembly in the attachment of this invention.

With reference to the drawing, the loader attachment of this invention, indicated generally at 10, is illustrated in Fig. 1 in assembly relation with a farm tractor 11 having a main frame 12. The attachment 10 includes a pair of mounting plates 15 (Figs. 1 and 3) releasably attached to transversely opposite sides of the frame 12 adjacent the front end 13 thereof.

A transverse shaft 14, positioned below the tractor main frame 12 and carried on and extended between the plates 15, rotatably supports a pair of bell crank members 16 (Figs. 1 and 3) arranged at transversely opposite sides of the frame 12.

A pair of hydraulic cylinder assemblies 17, corresponding to the bell cranks 16, have one of their ends pivotally supported at 18 on the frame 12 at positions rearwardly of the cranks 16 and their opposite ends pivotally connected at 19 to the bell cranks 16. On supply of fluid under pressure to a hydraulic assembly 17, from a reservoir 21 and through a flexible line 22, a piston rod 23 (Figs. 2 and 4) for an assembly 17 is extended forwardly to rotate a corresponding bell crank 16 in a clockwise direction as viewed in Figs. 1 and 2.

The loader attachment 10 further includes a pair of lift booms 24 (Figs. 1 and 2) secured to and extended forwardly from the bell crank members 16. At their forward ends 26, the lift booms 24 carry a transverse tubular beam 27 secured to and extended between the booms 24 and arranged forwardly of the front end 13 of the tractor frame 12. The beam 27 supports a plurality of spaced forwardly projected tines or fork members 28 which have their rear end portions 25 supported within and extended substantially diametrically of the transverse beam 27.

It is seen, therefore, that the beam 27 and the tine members 28 cooperate to provide a load carrying unit or fork, designated generally at 31, at the forward ends 26 of the lift booms 24. On clockwise rotation of the crank members 16, as viewed in Fig. 1, in response to operation of the hydraulic cylinder assemblies 17, the lift booms 24 are rotated in the same direction. As a result, the fork 31 is raised from the loading or ground engaging position shown in Figs. 1 and 3 to a transport and dumping position illustrated in Figs. 2 and 4.

Movably mounted on the fork 31 for ejecting material to be dumped therefrom is an upright back ejector plate 32 (Figs. 1–4, inclusive) provided with an upwardly and forwardly inclined portion 30 which facilities the cradling therein of material on the fork 31. The ejector plate 32 is of a plate construction and has the lower end 33 thereof slidably supported on the tine members 28. A pair of rings 34 carried on the ends 35 of the ejector plate 32 are loosely received on the end most tine members 28a. By virtue of this assembly of the ejector plate 32 on the fork 31, the plate 32 is both movable longitudinally of the fork 31 and rotatable or tiltable relative to the fork 31 and about the rings 34.

For moving the ejector plate 32 relative to the fork 31, a transverse rock shaft 36 is extended between and rotatably supported on the booms 24 at a position rearwardly of and adjacent to the transverse beam 27. Secured to and extended upwardly from the rock shaft 36, adjacent one end 37 thereof, is a rock arm 38. A hydraulic cylinder assembly 39, pivotally supported at one of its ends at 41 on a bracket 81 mounted on one of the lift booms 24, has the piston rod 42 at the opposite end thereof pivotally connected at 43 to the rock arm 38.

The bracket 81 is attached to the boom 24 by upright bolts 82 extended through slots 83 in the boom 24. As a result, the bracket 81 is adjustable longitudinally of the boom 24, on loosening of the bolts 82, to vary the position of the assembly 39 to insure a desired stroke of the ejector plate 32. In other words, to provide for a position of the ejector plate 32 adjacent to but not beyond the outer ends of the tines 28 on full extension of the piston rod 42.

On application of fluid under pressure from the reservoir 21 through a line 44 (Figs. 1 and 4) to the cylinder assembly 39, the piston rod 42 is extended to rotate the rock arm 38 and rock shaft 36 in clockwise directions as viewed in Figs. 3 and 4. When the pressure on such fluid is relieved, a spring 46 extended between the cylinder assembly pivot 41 and the rock arm 38, operates to return the rock arm 38 and rock shaft 36 to positions corresponding to a retracted position of the piston rod 42 (Fig. 3).

A first pair of transversely spaced link members 47 (Fig. 2) are secured at their ends 48 at longitudinally spaced positions on the rock shaft 36. At their opposite ends 49, the members 47 are pivotally connected to the ends 51 of a second pair of link members 52. The opposite ends 53 of the link members 52 are rigidly secured to the rear side 54 of the ejector plate 32 intermediate the upper and lower ends thereof. A pair of brace members 56 corresponding to the links 52 are secured to and extended between the links 52 and the ejector plate 32.

As best appears in Fig. 3, the links 47 and 52 operate as associated hinge members and are relatively folded in the retracted or load carrying position of the ejector plate 32 to positions adjacent the lift booms 24. On a supply of fluid to the cylinder assembly 39, the piston rod 42 is extended to rotate the rock arm 38 and the rock shaft 36 in a clockwise direction as viewed in Fig. 3. In response to such rotation, the links 47 are likewise rotated in a clockwise direction as viewed in Fig. 3, resulting in a progressive unfolding of the links 47 and 52. As a result of such unfolding, the links 52 are moved forwardly to slide the ejector plate 32 forwardly on the fork 31. Concurrently with being moved forwardly, the links 52 are rotated by the links 47 in a clockwise direction as viewed in Fig. 3. By virtue of the rigid connection of the plate 32 with the ends 53 of the links 52, the plate 32 is also rotated in a clockwise direction in response to the rotation of the links 52. As a result, the plate 32 is tipped forwardly about the ring connections 34 on the tine members 28a. As a result of the construction and relative arrangement of the plate 32 with the links 47 and 52, and the rock shaft 36, the lower end of the plate is maintained on the fork 31 and held against any upward and rearward movement.

It is seen, therefore, that the ejector plate 32 is concurrently moved forwardly on the fork 31 and tipped or rotated in a forward direction. As a result, in the final forward or dumping position of the ejector plate 32 adjacent the front end 50 of the load carrying unit 31 (Fig. 4), the plate 32 is tipped in a forward direction an amount to insure the dumping of all material from the fork 31. The spring 46 operates to return the ejector plate 32 to its retracted position (Fig. 3), when the fluid pressure in the cylinder assembly 39 is relieved.

For using the fork 31 as a scoop, a covering plate 61 (Fig. 5) is removably supported on the fork 31. The plate 61 has a reversely bent end portion 62 which is positioned over the front end 50 of the fork 31 for use as the working end of the scoop plate 61. The rear end 63 of the plate 61 abuts against the support tube 27 and is positioned beneath the ejector plate 32 and between the ring connections 34 in all positions of the plate 32. The ejector plate 32 thus slides across the plate 61 in dumping material therefrom and functions in a manner identical to that described above in connection with the fork 31.

In the use of the tractor 11 with the loader attachment 10, the usual loading operation is accomplished with the fork 31 in the lower position shown in Figs. 1 and 3. The hydraulic cylinder assemblies 17 are actuated to rotate the bell cranks 61 in a direction to provide for upward swinging movement of the lift booms 24 to the transport and dumping positions illustrated in Fig. 2. When the tractor 11 has been moved, with the load on the fork 31, to a location where the load is to be dumped, the hydraulic cylinder assembly 39 is actuated to move the ejector plate 32 forwardly to dump the load from the fork 31 (Fig. 4). The spring 46 insures a return of the ejector plate 32 to its position adjacent the beam 27 when the load has been dumped.

In the modified mounting of the load carrying unit 31 illustrated in Fig. 6, the unit 31 is adjustably mounted on the lift booms 24. Since the mounting of the unit 31 is identical on each boom 24, only one boom 24 is shown in Fig. 6 and only the mounting thereon will be described in detail.

The tubular beam 27 is provided with a pair of rearwardly extended arms 71 (only one of which is shown), corresponding to the lift booms 24 and provided with triangular shape terminal end portions 72. An arm 71 is pivotally connected to a corresponding lift boom 24 by a transverse bolt or pivot 73 located forwardly of the terminal end portion 72.

The load carrying unit 31 is thus adjustable in up and down directions about the pivots 73 with the arm end portions 72 being movable up and down within the channel shape booms 24. For retaining the unit 31 in an adjusted position a pair of tapered wedge members 77 are inserted between opposite sides of the arm end portion 72 and tracks 78 on the boom flanges 76. The wedge members 77 are relatively movable longitudinally of a boom 24 to accommodate a moved position of the arm 71 in response to movement of the unit 31 to an adjusted position, and releasably lock the unit 31 in such position. A pair of set screws 75 mounted on the beam flanges 76 are movable into engagement with the wedges 77 to maintain the wedges 77 in a moved position.

When the unit 31 is mounted on the booms 24 as shown in Fig. 6, therefore, the pitch or inclination of the unit 31 relative to the booms 24 is readily adjusted to facilitate the performance of various farm operations.

From the above description, it is seen that this invention provides a loader attachment 10 which is readily applied to and removed from the tractor 11, since it is only necessary to remove the support plates 15 from the tractor frame 12 to remove the entire loader attachment 10.

It is also readily apparent that the lift booms or arms 24 may be disconnected from the bell cranks 16, by removing connecting bolts 55 when the loader attachment is not required, so that the plates 15, bell cranks 16 and rock shaft 14 can be left on the tractor without interfering with the use of the tractor in many other farming operations. By virtue of the provision of the ejector plate 32, a smaller degree of raising movement of the load carrying unit 21 is required in the attachment 10 than in a conventional pivoted bucket type load carrying unit. In other words, with the loader attachment 10, it is only necessary to raise the load carrying unit 31 above the wagon box or other receptacle for the material to be dumped, while in the conventional loader attachment, it is necessary to raise the pivoted bucket an additional distance to compensate for the downward tipped position of the bucket in a released position thereof.

Although the invention has been described with respect to a preferred embodiment thereof, it is to be understood that it is not to be so limited, since changes can be made therein which are within the scope of the appended claims.

I claim:

1. For use with a tractor having a main frame and front wheels, a loader attachment comprising a pair of crank members rotatably supported on said main frame adjacent the front end thereof, a pair of lift booms secured to said crank members, with said lift booms being movable to raised and lowered positions in response to rotation of said crank members, and in said lowered positions being opposite from and to the outside of said front wheels, a load carrying unit secured to and extended between said lift booms at a position forwardly of said front wheels, an upright ejector plate movably mounted on said unit for sliding and tilting movement relative thereto, a transversely extended rock shaft rotatably supported on said lift booms rearwardly of said unit, a first pair of link members secured at one of their ends to said rock shaft and extended rearwardly therefrom so as to be in a straddling relation with said front wheels, a second pair of link members pivotally connected at one of their ends to the free ends of said first pair of link members and connected at their opposite ends to said ejector plate, with said first pair of links being of a shorter length than said second pair of links, and means carried on one of said lift booms and operatively associated with said rock shaft for rotating said rock shaft to move said first pair of link members to upright positions for concurrently sliding and tipping said ejector plate relative to said load carrying unit.

2. For use with a tractor having a main frame and front wheels, a loader attachment comprising a pair of lift booms rotatably supported on said main frame adjacent the front end thereof, means for moving said lift booms to raised and lowered positions therefor, with said lift booms in their lowered positions being opposite from and to the outside of said front wheels, a load carrying unit secured to and extended between said lift booms at a position forwardly of said front wheels, an upright ejector plate movably mounted on said unit for sliding movement relative thereto, means for moving said ejector plate including a pair of hinged assemblies corresponding to said lift booms, means pivotally supporting one of the ends of said assemblies on a lift boom, with the other ends of said assemblies being secured to said ejector plate, said assemblies, when said lift booms are in lowered positions and said ejector plate is in a rearward position on said load carrying unit, being folded and extended rearwardly to opposite sides of said front wheels, and means on one of said lift booms operatively associated with said hinged assemblies for concurrently moving said hinged assemblies upwardly and forwardly to open positions therefor to provide for a forward movement of said ejector plate.

References Cited in the file of this patent

UNITED STATES PATENTS

| | | |
|---|---|---|
| 2,472,194 | Cook | June 7, 1949 |
| 2,511,439 | Lacey | June 13, 1950 |
| 2,638,237 | Struthers et al. | May 12, 1953 |
| 2,671,570 | Richey | Mar. 9, 1954 |
| 2,676,719 | Wagner et al. | Apr. 27, 1954 |
| 2,701,072 | Chambers et al. | Feb. 1, 1955 |